(12) United States Patent
Gupta (10) Patent No.: US 10,735,581 B2
(45) Date of Patent: *Aug. 4, 2020

(54) AUTHENTICATION USING DTMF TONES

(71) Applicant: PINDROP SECURITY, INC., Atlanta, GA (US)

(72) Inventor: Payas Gupta, Atlanta, GA (US)

(73) Assignee: Pindrop Security, Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/551,327

(22) Filed: Aug. 26, 2019

(65) Prior Publication Data

US 2019/0387096 A1    Dec. 19, 2019

Related U.S. Application Data

(63) Continuation of application No. 15/872,639, filed on Jan. 16, 2018, now Pat. No. 10,397,398.

(Continued)

(51) Int. Cl.
*H04M 3/38* (2006.01)
*H04M 3/51* (2006.01)
(Continued)

(52) U.S. Cl.
CPC ........ *H04M 3/382* (2013.01); *H04L 63/0838* (2013.01); *H04L 63/18* (2013.01);
(Continued)

(58) Field of Classification Search
CPC .... H04M 3/382; H04M 3/5166; H04M 3/493; H04M 2203/6072; H04M 2203/6081;
(Continued)

(56) References Cited

U.S. PATENT DOCUMENTS 5,949,874 A    9/1999  Mark
6,021,119 A    2/2000  Derks et al.
(Continued)

OTHER PUBLICATIONS

Notification of Transmittal of the International Search Report and the Written Opinion of the International Searching Authority, dated May 14, 2018, in corresponding International Application No. PCT/US2018/013965, 13 pages.

*Primary Examiner* — Stella L. Woo
(74) *Attorney, Agent, or Firm* — Foley & Lardner LLP (57) ABSTRACT

A method of obtaining and automatically providing secure authentication information includes registering a client device over a data line, storing information and a changeable value for authentication in subsequent telephone-only transactions. In the subsequent transactions, a telephone call placed from the client device to an interactive voice response server is intercepted and modified to include dialing of a delay and at least a passcode, the passcode being based on the unique information and the changeable value, where the changeable value is updated for every call session. The interactive voice response server forwards the passcode and a client device identifier to an authentication function, which compares the received passcode to plural passcodes generated based on information and iterations of a value stored in correspondence with the client device identifier. Authentication is confirmed when a generated passcode matches the passcode from the client device.

20 Claims, 5 Drawing Sheets

Related U.S. Application Data (60) Provisional application No. 62/447,266, filed on Jan. 17, 2017.

(51) Int. Cl.
*H04L 29/06* (2006.01)
*H04M 3/42* (2006.01)
*H04M 3/493* (2006.01)

(52) U.S. Cl.
CPC ...... *H04M 3/5166* (2013.01); *H04M 3/42008* (2013.01); *H04M 3/493* (2013.01); *H04M 2203/6072* (2013.01); *H04M 2203/6081* (2013.01)

(58) Field of Classification Search
CPC . H04M 3/42008; H04L 63/0838; H04L 63/18
See application file for complete search history.

(56) References Cited

U.S. PATENT DOCUMENTS

| | | |
|---|---|---|
| 8,046,230 B1 | 10/2011 | McIntosh |
| 8,738,442 B1 | 5/2014 | Liu et al. |
| 8,856,895 B2 | 10/2014 | Perrot |
| 9,277,049 B1 | 3/2016 | Danis |
| 9,338,619 B2 | 5/2016 | Kang |
| 9,344,892 B1 | 5/2016 | Rodrigues et al. |
| 9,860,367 B1 | 1/2018 | Jiang et al. |
| 10,397,398 B2 * | 8/2019 | Gupta ............... H04L 63/18 |
| 2009/0138712 A1 | 5/2009 | Driscoll |
| 2014/0241513 A1 | 8/2014 | Springer |
| 2014/0250512 A1 | 9/2014 | Goldstone et al. |
| 2015/0036813 A1 | 2/2015 | Ananthakrishnan et al. |
| 2017/0060779 A1 | 3/2017 | Falk |

\* cited by examiner

AUTHENTICATION USING DTMF TONES

This application is a continuation of U.S. patent application Ser. No. 15/872,639, filed Jan. 16, 2018 and titled "Authentication Using DTMF Tones," which in turn claims priority to U.S. Provisional Application No. 62/447,266, filed 17 Jan. 2017 and titled "Authentication Using DTMF Tones," each of which is incorporated herein by reference in its entirety.

This application is related to methods and systems for user authentication over a telephone channel, and specifically toward use of dual-tone multi-frequency (DTMF) signaling to efficiently securely transmit unique identification and transaction data over a telephone communication channel.

BACKGROUND

Certain industries and companies employ one or more telephone systems for purposes of conducting sales, customer support, providing interactive services, and the like. For example, a banking institution may provide phone-based account services that provide customer access to a live bank representative, access to an automated interactive voice response (IVR) system or a combination thereof. The identification of the caller must be determined and verified. Conventionally, such verification includes user input and/or verbal exchange of verifying data, such as a government identification number, mother's maiden name, account information, past transaction details and the like. However, this manual exchange of data takes time and resources, and thus multiplies the costs of the provided services. Moreover, because every subsequent authentication exchange may involve communication and remote storage of personally identifiable information, it multiplies a user's risk of identity theft and exposure through data breaches.

In other instances, an institution may provide computer-based account services that provide customer access to banking services, in which user or client device verification includes an exchange, entirely over a data channel, of verifying data such as a user name and password. However, this approach is impossible without access to a data channel. Moreover, a fraudulent user can bypass the security aspects of a data-channel approach by spoofing a legitimate user's phone number and calling the institution, claiming that a data channel is unavailable or not working, and then verbally providing account details obtained elsewhere. Even in authentication systems that offer two-part authentication, where the institution provides a one-time passcode via email or phone call, the exchange of information requires a data channel, and requires additional delay for receipt of the passcode and user entry of the passcode.

What is needed is a system that efficiently—and securely—exchanges authorization data, minimizing or eliminating the need for a customer to verbally or tactilely provide authentication data, while enhancing the reliability of authentication.

SUMMARY

The presently claimed inventions are directed to methods and apparatuses for use in, for example, a client device and a server involved in an authentication of a client device.

According to disclosed embodiments, a method for use in a client device includes, in an operating mode, detecting a user telephone call action corresponding to a first predetermined telephone number and, upon detecting the user telephone call action, automatically dialing, using dual-tone multi-frequency (DTMF) signaling, an authentication sequence. The authentication sequence may include a second predetermined telephone number for an outgoing telephone call to a first server, a predetermined delay command, and a passcode. The passcode is based, at least in part, on information previously received from an authentication server and stored at the client device.

According to an embodiment, detecting the user telephone call action may include detecting an outgoing call made to the first predetermined telephone number and terminating the detected outgoing call.

According to an embodiment, the user telephone call action may include a user input that dials the first predetermined telephone number.

According to an embodiment, the user input may include any one of: user dialing of the first predetermined phone number; user selection, for dialing, of the first predetermined telephone number from a contact display or call history; and pressing a button associated with dialing the first predetermined telephone number.

According to an embodiment, the second predetermined telephone number may be the same as the first predetermined telephone number.

According to an embodiment, the predetermined delay command may include a hard pause. The method may further include displaying a user interaction request after dialing the predetermined delay command, and receiving a specified user response to the user interaction request before continuing to dial the passcode.

According to an embodiment, the first server may be an interactive voice response (IVR) system configured to automatically respond to an audio signal received from the client device.

According to an embodiment, when in the operating mode, the method may further include transmitting one or more client metadata to the first server using DTMF signaling via the outgoing call to the first server.

According to an embodiment, the client metadata may include one or more of: location information of the client device, an account number, biometric data, and personally identifiable information, and the method may include encoding the client metadata.

According to an embodiment, the method may further include encoding the client metadata, and the encoding may utilize one or more of a hash, a keyed-hash, and the information stored at the client device.

According to an embodiment, the location information includes any one or more of a cell tower ID, a zip code, a general geographical area, and GPS coordinates.

According to an embodiment, in a registration operation, the method may further include receiving a user credential via a user input, transmitting the user credential to the registration server, receiving an indication of successful authentication from the registration server, transmitting a request message that requests the information from the authorization server, receiving the information from the authorization server in response to the request message; and storing at least a portion of the information in a non-volatile memory of the client device.

According to an embodiment, the transmitting of the user credential may be performed via a data channel.

According to an embodiment, the transmitting of the user credential may include at least one of encrypting the user credential and using a secure data channel.

According to an embodiment, the client device may obtain the information from the authentication server via the registration server.

According to an embodiment, the non-volatile memory may be a secure location in memory of the client device.

According to an embodiment, the method may further include computing the passcode anew for each outgoing telephone call to the first server.

According to an embodiment, the computing of the passcode may use at least a previously received token, stored by the client device, and a changeable value.

According to an embodiment, the passcode may be computed based on a preset hash encryption algorithm using the previously received token and the changeable value.

According to an embodiment, the predetermined hash encryption algorithm may be a keyed-hash message authentication code using a cryptographic hash function.

According to an embodiment, the changeable value may be changed for each outgoing telephone call from the client device to the first server.

According to an embodiment, the changeable value may be a random numeric value that is updated based on a predetermined algorithm that is also used by the authentication server.

According to an embodiment, the predetermined algorithm may change the random numeric code by incrementing the random numeric code by a predetermined amount.

According to an embodiment, the changeable value may be based on a clock of the client device that is synchronized with a clock of the authentication server.

According to an embodiment, in the registration operation, the method may further include synchronizing the clock of the client device and the clock of the authentication server.

According to disclosed embodiments a method for use in a server may include receiving, via a telephone call established from a client device, authentication information represented in a dual-tone multi-frequency (DTMF) signal. The DTMF signal may be converted to electronic data representing the authentication information. The electronic data may be communicated to an authentication function. A client device identifier may be communicated to the authentication function. An indication of an authentication result based on the authentication information represented in the electronic signal may be received from the authentication function.

According to an embodiment, the authentication information may include at least a passcode.

According to an embodiment, the passcode may be a hash encoding or keyed-hash encoding of a token and a session-specific value.

According to an embodiment, the authentication function includes generating a plurality of passcodes based on all of: the client device identifier, a previously stored secret key indexed to the client device identifier, and a respective value from a plurality of values, the secret key corresponding to the token.

According to an embodiment, the plurality of values may include a previously stored counter and iterations of the counter generated based on a predetermined algorithm.

According to an embodiment, the plurality of values may include a clock value and iterations of the clock value generated based on a predetermined algorithm.

According to an embodiment, the authentication function may be executed by an authentication server.

According to an embodiment, communicating the electronic signal and the identification of the client device may include encoding at least one of the client device identifier, where the encoding of the client device identifier provides an anonymized version of the identifier.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being part of a described embodiment. Thus, the breadth and scope of the present disclosure, especially in any following claims, should not be limited by any of the above-described exemplary embodiments.

DETAILED DESCRIPTION

The detailed description set forth below in connection with the appended drawings is intended as a description of exemplary embodiments of the present disclosure and is not intended to represent the only embodiments in which the present disclosure can be practiced. The term "exemplary" used throughout this description means "serving as an example, instance, or illustration," and should not necessarily be construed as preferred or advantageous over other embodiments, whether labeled "exemplary" or otherwise. The detailed description includes specific details for the purpose of providing a thorough understanding of the embodiments of the disclosure. It will be apparent to those skilled in the art that the embodiments of the disclosure may be practiced without these specific details. In some instances, well-known structures and devices may be shown in block diagram form in order to avoid obscuring the novelty of the exemplary embodiments presented herein.

A general overview of a system utilizing the disclosed methods and apparatus is presented first, followed by detailed description disclosing specific methods and apparatus for utilizing DTMF signaling of device-specific verification information and other information. The inventors envision that various embodiments disclosed herein may be implemented separately, in parallel use, and/or in combinations that beneficially share resources, structure and/or function. It will be appreciated that for practical reasons not all combinations contemplated by the inventors are explicitly detailed in this written description.

Banks and other institutions (collectively "institutions") commonly exchange financial, medical, legal or other private data with their account holders. It is thus important that such communication be limited to authorized persons. When the user has a question or otherwise needs to contact the institution by telephone, the user may, at least initially, traverse automated interactive voice response (IVR) system prompts, providing authentication information manually at one or more branches of the IVR system "tree", sometimes providing the same information multiple times during the course of a particular session, and furthermore must enter this authentication information at each session. Often this information and other personally identifiable information must be provided to a live agent to further authenticate the user.

In other situations, the user may speak with a live customer service representative, and must verbally provide sufficient authentication data to ensure sensitive data remains secure. This personal authentication interaction takes significant time for every call, and collectively imposes considerable cost to the institution and/or reduces availability of customer service to users. Moreover, the type and amount of information that can be communicated by manual user input is limited by the time and resources of the user, and often includes personally identifiable information (e.g., "mother's maiden name" and the like) that is not private due to disclosure through social media, public databases or data breaches. Still further, the data typically entered manually or verbally by a user is exposed directly to electronic or in-person eavesdropping. Accordingly, the inventors have recognized a need for a method of efficiently communicating sensitive authentication information over telephone channels.

As discussed herein, inefficiencies and security compromises noted above may be addressed by the disclosed invention. Mobile telephones, personal assistant devices, VoIP phones and other client devices may be equipped with a software library or program (or "app" or "skill"), possibly specific to the institution, that permits a user to efficiently and securely exchange sufficient authentication information with a target server or institution over a telephone channel, minimizing the per-session exposure of personally identifiable information and reliably providing unique authorization for each session.

Dual Tone Multi-Frequency (DTMF) signaling is an in-band telecommunication signaling system using the voice-frequency band over telephone lines between telephone equipment and other communications devices and switching centers. Conventionally, remote client users manually enter DTMF tones to navigate IVR options and to enter requested information (e.g., an account number or government identification number). This disclosure provides methods of using DTMF tones for automatically and securely communicating identifying information and other information of registered users or devices for authentication. The tones are sent over telephone call after the call is connected. Using these DTMF tones the identity of the user is verified.

Figure 1:
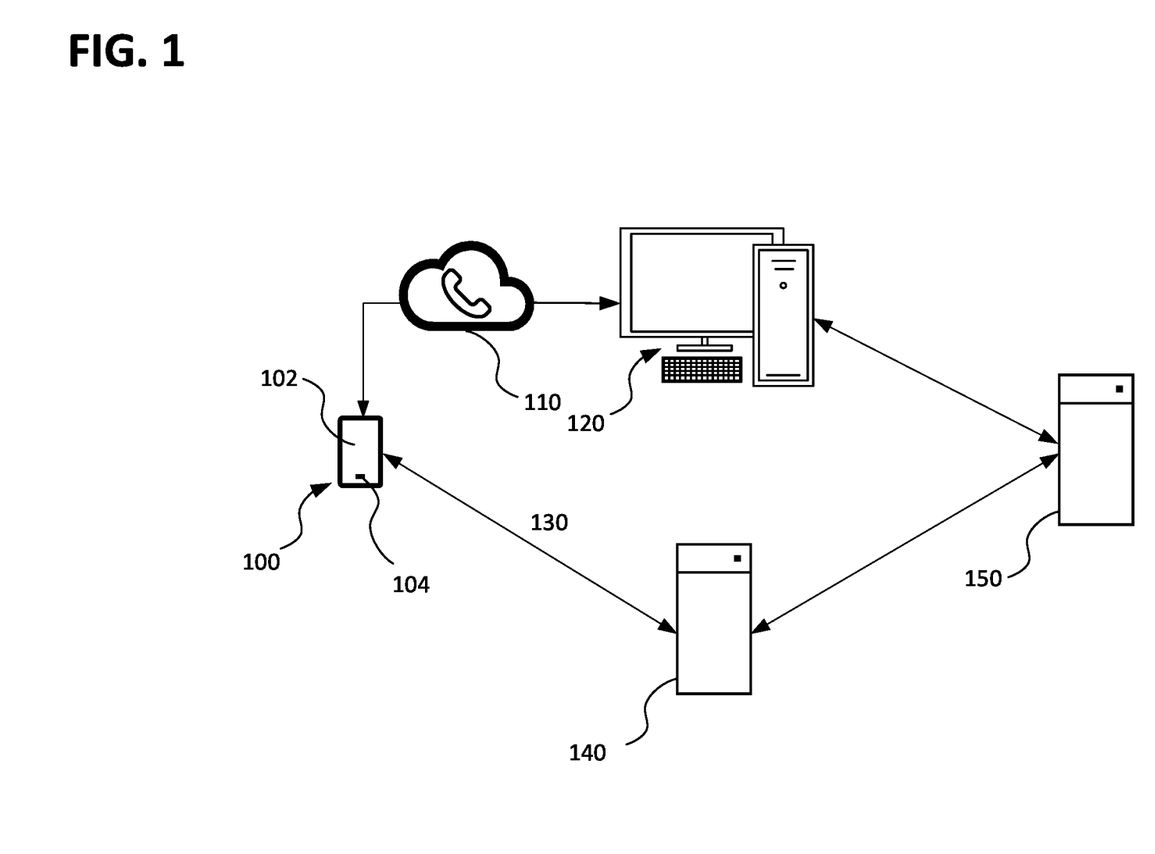
FIG. 1 is a block diagram illustrating a general overview of a possible hardware implementation according to an embodiment.

FIG. 1 is a block diagram illustrating a general overview of a possible hardware implementation that utilizes the present disclosure. A client device 100 is configured for communication over a telephone channel 110 (e.g., PSTN) to a first server 120 and for communication over a data channel 130 to a registration server 140. In some embodiments, as discussed in greater detail below, the first server 120 and the registration server 140 may each be configured to communicate with an authentication server 150 via one or more data channels. In some implementations, the first server 120 and the registration server 140 may be combined in one location or in one server (not illustrated). The first server 120 may include an interactive voice response (IVR) system configured to receive and interpret audio signals, particularly DTMF signals.

Using the disclosed methods, there is no need to use a separate data channel for authenticating the user or client device 100 after a first, registration connection. After registration with the authentication function/server 150, the client device 100 carries all the information (e.g., a seed for a one-time passcode or even a multi-use passcode) needed to supply unique, even single-use authentication information. This permits future authentication sessions to be performed over a telephone channel even in (e.g., rural or remote) circumstances where a data channel may be unavailable, unreliable, unsecure; or otherwise undesirable to a user.

The client device 100 may be a mobile telephone, a VoIP (voice over IP) client, a mobile computer, an intelligent personal assistant device (e.g., device utilizing the "ALEXA" service of AMAZON.COM) or the like). The client device 100, particularly—but not limited to—a mobile telephone, may include a touchscreen 102, one or more physical keys 104, one or more antennae for wireless telephone communication, wireless data communication, and the like. Data communication capabilities of the client device 100 over the data channel 130 may include conventional wireless (or, less commonly, wired) communications utilizing Ethernet protocols, wireless fidelity (Wi-Fi) protocols, Bluetooth, z-wave, data-specific cellular communication protocols (e.g., LTE) and/or the like. Thus, the term "data channel" is intended to correspond with the respective protocol appropriate to a particular data communication type.

Telephone communication capabilities of the client device 100 may include cellular and/or voice over IP (VoIP) communication protocols, and/or the like, and the telephone channel 110 corresponds to the respective communication protocol(s). The client device 100 may include data storage circuitry such as flash memory, a solid state drive (SSD), a hard disk drive (HDD), and/or the like. A processor of the client device may be configured to execute instructions that interpret user inputs via the touchscreen 102, button(s) 104, and/or via a microphone (not shown) through voice recognition, artificial intelligence or the like (e.g., voice-enabled personal assistant). In some implementations, the touchscreen 102 may display a user interface specific to a particular purpose (an "app") that can facilitate data or telephone communication to/from the client device 100. In the present disclosure, the client device 100 may run an app or program for initially registering the client device 100 using a registration server 140 (and in some instances an authentication server 150) via the data channel 130 and thereafter communicating authentication via the telephone channel 110 using DTMF signaling.

The first server 120, the registration server 140, and the authentication server 150 may be computer systems each having at least one or more processors, volatile and nonvolatile memory, and communication circuitry. The first server 120 may also include or be connected to a modem (not shown) configured to receive audio data over the telephone channel 110 and to convert that audio data to electronic data. In some instances, at least the first server 120 may be implemented in a mobile device. The data communication capabilities of the first server 120, the registration server 140, and the authentication server 150 may include conventional wireless or wired data communications circuitry configured, by non-limiting example, to utilize Ethernet protocols, wireless fidelity (Wi-Fi) protocols, Bluetooth, and/or the like.

As will become apparent, instructions respectively executed by the registration server 140 and authentication server 150 may be separate (as illustrated) or in some implementations may be included in a single authentication server. In another embodiment, the functions of the first server 120 and the registration server 140 may be performed by a singer server. In certain embodiments, the functions of first server 120, registration server 140 and authentication server 150 may all be performed by a single server. Conversely, the functions described herein may be distributed among servers in addition to those explicitly described.

Figure 2:
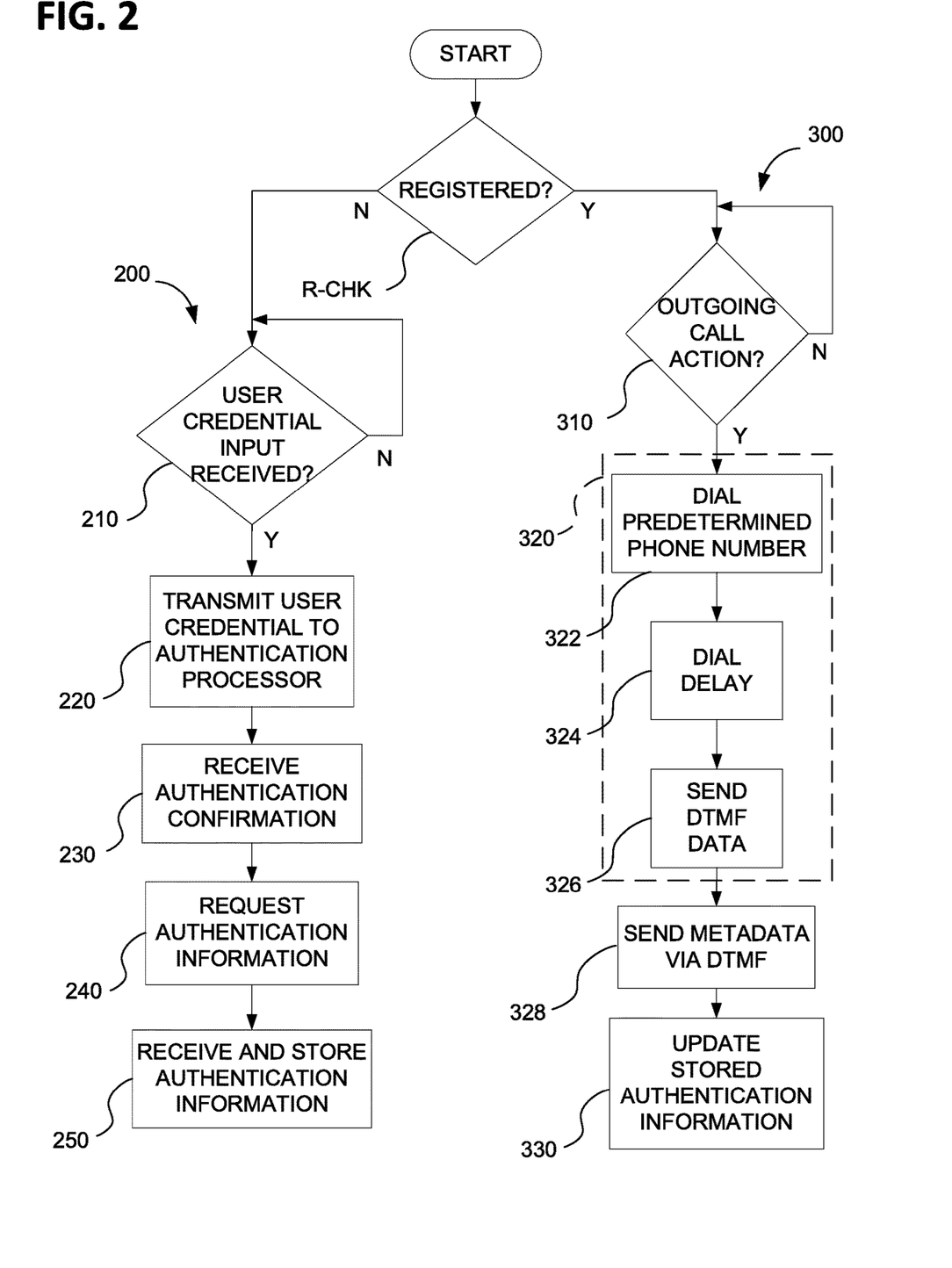
FIG. 2 illustrates a method performed by a client device, such as the client device 100 of FIG. 1 according to an embodiment.

FIG. 2 illustrates a method performed by a client device, such as the client device 100 of FIG. 1. The method is illustrated in two parts 200, 300. A registration operation 200 for initially registering a user over a data channel includes the following operations. An initial operation (labeled "R-CHK.") determines whether the client device 100 has been previously registered (e.g., via a client app executed by the client device 100). If the client device 100 has not been registered ("N"), a registration operation 200 is initiated. In a first step 210 of the registration operation 200 it is determined whether or not a user credential has been input by a user. This user credential input may include entry of an account number, password, token or the like via a physical or virtual keypad; entry of biometric data such as photo, fingerprint, voice statistic or the like; or may include selection of a previously stored file or token. The user credential input may be processed by the app of the client device 100 or may be used in its direct form.

The user credential is then transmitted via a data channel, at step 220, to a registration processor (e.g., registration server 140) for verification, e.g., by comparison with previously supplied information. For example, a bank-related app may require an account number and password be transmitted via SSL or another secure Internet protocol to a bank server for authentication. Upon successful authentication, the client device 100 may receive an authentication confirmation (step 230). Once authenticated, at step 240 the client device may request authentication information from the registration processor 140, which at step 250 may be received from the registration processor 140 and stored for future use. In some embodiments, the authentication information may be stored in a secure location that is accessible only to a particular app.

Returning to step R-CHK, if the client device 100 determines it has been previously registered ("Y") the client device enters an operating mode 300. In operation 310, the client device 100 detects whether or not a user performs a user telephone call action corresponding to a first predetermined telephone number. The user telephone call action may, for example, include direct dialing the first predetermined telephone number, selecting the first predetermined telephone number for dialing from a contact list, using a voice command to initiate a call, or engaging a call function of an app that dials the first predetermined telephone number. For example, a bank app may display a virtual button that, when clicked, dials the predetermined phone number of the bank.

Upon detecting the user telephone call action ("Y" at operation 310), the client device 100 may (at operation 320) dial an authentication sequence including (at operation 322) dialing a predetermined telephone number, (at operation 324) dialing a delay when the predetermined telephone number is connected, and (at operation 326) dialing predetermined DTMF data including a passcode, where the passcode is based on the authentication information received from the registration processor 140 and stored by the client device. (FIG. 3, described in detail below, illustrates the authentication sequence.) In some embodiments, the authentication sequence 320 may additionally include (at operation 328) sending of client metadata via DTMF. For example, metadata sent by the client device 100 may include client device location information (e.g., a cell tower ID, a zip code, a general geographical area and/or GPS coordinates, or the like), an account number, biometric data (e.g., voice statistics, gender, or the like), client statistics or history, and/or personally identifiable information (e.g., name, address, government identification number, or the like). In some embodiments this metadata may be used to aid authentication of the client device or its user. In some embodiments the metadata may be encoded and/or encrypted, e.g., via hash or keyed hash using the stored token and/or changeable value. It must be acknowledged that any DTMF-digit characters and all dial string characters after the first pause character or DTMF-digit should be sent to the telephone channel (line) using DTMF in-band signaling, even if dialing of the phone number is done using direct network signaling (e.g., as used by a mobile phone).

At operation 330, the client device 100 may change at least a portion of the stored authentication information. As described in more detail below, this update can be matched at the authentication server 150 to facilitate the authentication of the client device 100. The predetermined telephone number, when connected, may provide an outgoing telephone call to a first server 120. As noted above, the first server 120 may include an IVR server or a combination IVR and an authentication function (as would be performed otherwise by the authentication server 150). The passcode may be based, at least in part, on the authentication information previously received from the registration server 140 and stored at the client device 100 (e.g., at operation 260).

The predetermined telephone number of the authentication sequence may be the first predetermined telephone number or a distinct second predetermined telephone number. In some implementations the operation mode 300 may terminate the dialed call in order to insert the DTMF data in the authentication sequence before redialing the same telephone number. In other implementations, the operation mode 300 may be configured to recognize and utilize context of the client device 100 to select a different telephone number for the authentication sequence. For example, the client device 100 may select a telephone number based on a context such as geographic location of the client device, a recent user action, or a state of an app. In some instances, particularly where the first predetermined telephone number was direct dialed or selected from a contact list or call history, the call may be terminated by the client after the call has engaged a telephone network (e.g., the predetermined telephone number has been transmitted from the client device), and before the authentication sequence is dialed.

Figure 3:
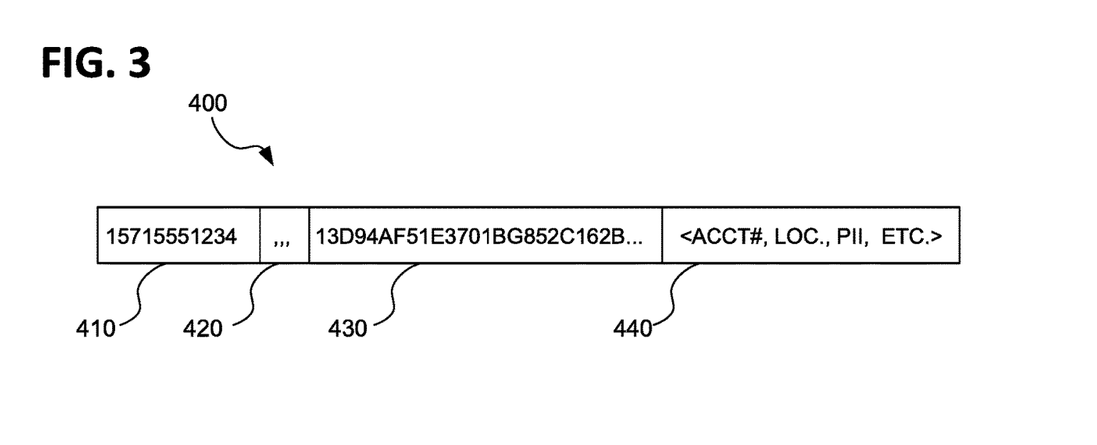
FIG. 3 illustrates an example authentication sequence, according to an embodiment.

FIG. 3 illustrates an example authentication sequence 400. The term "authentication sequence" need not be interpreted as requiring a particular data construct, but is intended merely to illustrate an order. However, it will be acknowledged that a client device 100 may in some embodiments utilize a particular construct to store an authentication sequence for later access. Alternatively the client device 100 may assemble an authentication sequence on-the-fly. The first portion (illustrated on the left) of the authentication sequence 400 contains a predetermined telephone number 410. A second portion of the authentication sequence may include one or more delay command(s) 420. A third portion of the authentication sequence 400 may include at least a passcode 430. In some implementations, a fourth portion of the authentication sequence 400 may include additional data ("metadata") for automatic transmission (not illustrated) to the first server 120. An additional delay may be provided between sending of the passcode at 430 and sending of such additional data.

The predetermined telephone number 410 may include a country code, area code, an extension, or the like in addition to a base telephone number. In some instances, the delay command(s) 420 may include a pause character representing a "soft pause", typically a comma ",", or the letter "p". Each instance of the pause character adds an additional small period of delay (e.g., one second) before proceeding with dialing the passcode and any additional information. The aggregate pauses permit timing of a particular DTMF transmission to be adjusted according to prompts at the first server 120 and/or delays in the communication channel. Alternatively, (or additionally), the delay command may include a "hard pause", also sometimes referenced as a "tone-wait". In some implementations, the hard pause character may be a semicolon ";" or the letter "w", in accord with common practice, although the client device and a recipient device (e.g., server) may be configured to recognize any character or pattern of characters as representing a soft pause or a hard pause. Whereas a soft pause inserts a set amount of delay before automatically proceeding with a next command or DTMF transmission, a hard pause waits for a tone. For example, in the present disclosure the user interface of the client device 100 may display a prompt for further user input consequent to the hard pause. When the user interacts with the prompt, the client device 100 may proceed to communicate subsequent information from the authentication sequence. For example, an app of the client device 100 may notify the user that certain information will be transmitted by the client device 100 upon user confirmation. In some embodiments such user prompt may provide the user with a choice of information to send or may notify the user that personally identifiable information will be transmitted upon confirmation.

The passcode 430 includes, or is based on, the information previously received from the registration server 140 and mutually stored by the authentication server 150 and the client device 100 during the registration operation 200. Despite the name inference of "code", a passcode may include an un-encoded representation (aside from the DTMF encoding) of the stored information or an encoded version of the stored information at the client device 100. In some embodiments, the information received from the authentication server 150 may include a secret key or token and an additional value that is either stored at or can be obtained by both the client device 100 and the second authentication server 150. By stating that the additional value "can be obtained by" both devices (100, 150), it is meant that the additional value is a changeable value, and its value is can be determined or derived at both the client device 100 and the authentication function/server 150 by a predetermined synchronization or updating method.

Figure 4:
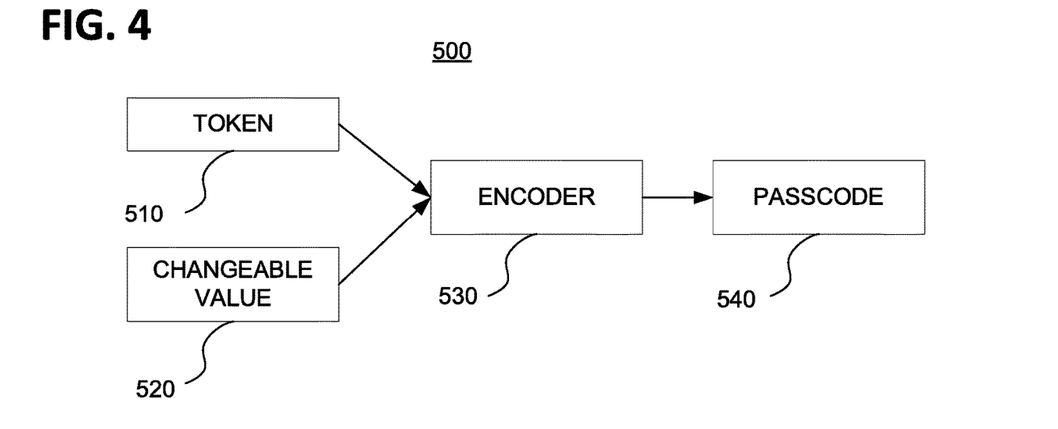
FIG. 4 is a block diagram illustrating the generation of a passcode, according to an embodiment.

FIG. 4 is a block diagram illustrating the generation of a passcode 540, corresponding to the passcode 430 of FIG. 3. An encoder 530 may generate the passcode, in one non-limiting example, by implementing a hash or keyed-hash encoding of a secret key or token 510 and a value 520 each stored previously from information received from the registration server 140, as described above. An algorithm used for the encoding may include, for example, a secure hash algorithm (SHA), message digest algorithm 5 (MD5) or another, more secure hash algorithm. All or a part of the passcode or the data represented thereby may be encoded. In some embodiments the client device 100 may encode the secret key or token using the additional (or changeable) value as a key, or vice versa.

A changeable value received by the client device 100 from the registration server 140 during registration and stored at the client device 100 may in one embodiment include a random numeric value that can be updated for each of multiple authentication sessions according to a predetermined algorithm. During the step of updating the stored authentication information (at operation 330) the client device 100 may update the random numeric value according to the predetermined algorithm, (e.g., increment by 1) and store the updated random numeric value in place of the previous one. Alternatively, the updated random numeric value may be stored in addition to one or more previous random numeric values.

In embodiments where the passcode utilizes a changeable value that is updated locally once for each call session as described above, the passcode may be generated anytime between authentication requests. For example, a passcode calculated during or after the previous session may be stored and then utilized for a next authentication. Alternatively, the passcode may be calculated when the user call event is detected (e.g., at operation 310 of FIG. 2) for immediate transmission during the same session. The latter implementation is suitable for a clock-based changeable value described below.

Other methods of coordinating a changeable value between the client device 100 and authentication server 150 are within the scope of this disclosure and may be implemented by those having skill in the art. For example, in another embodiment the changeable value received by the client device 100 in information from the registration server 140 during registration (see step 250 in FIG. 2) may be a clock synchronization value. The client device 100 and the authentication server 150 may, by synchronizing a clock value, have simultaneous access to an ever-changing clock value as the changeable value. In some implementations, a latency amount may be applied to an obtained value to account for inherent delays in the communication channel between the client device 100 and registration server 140 and/or authentication server 150.

Figure 5:
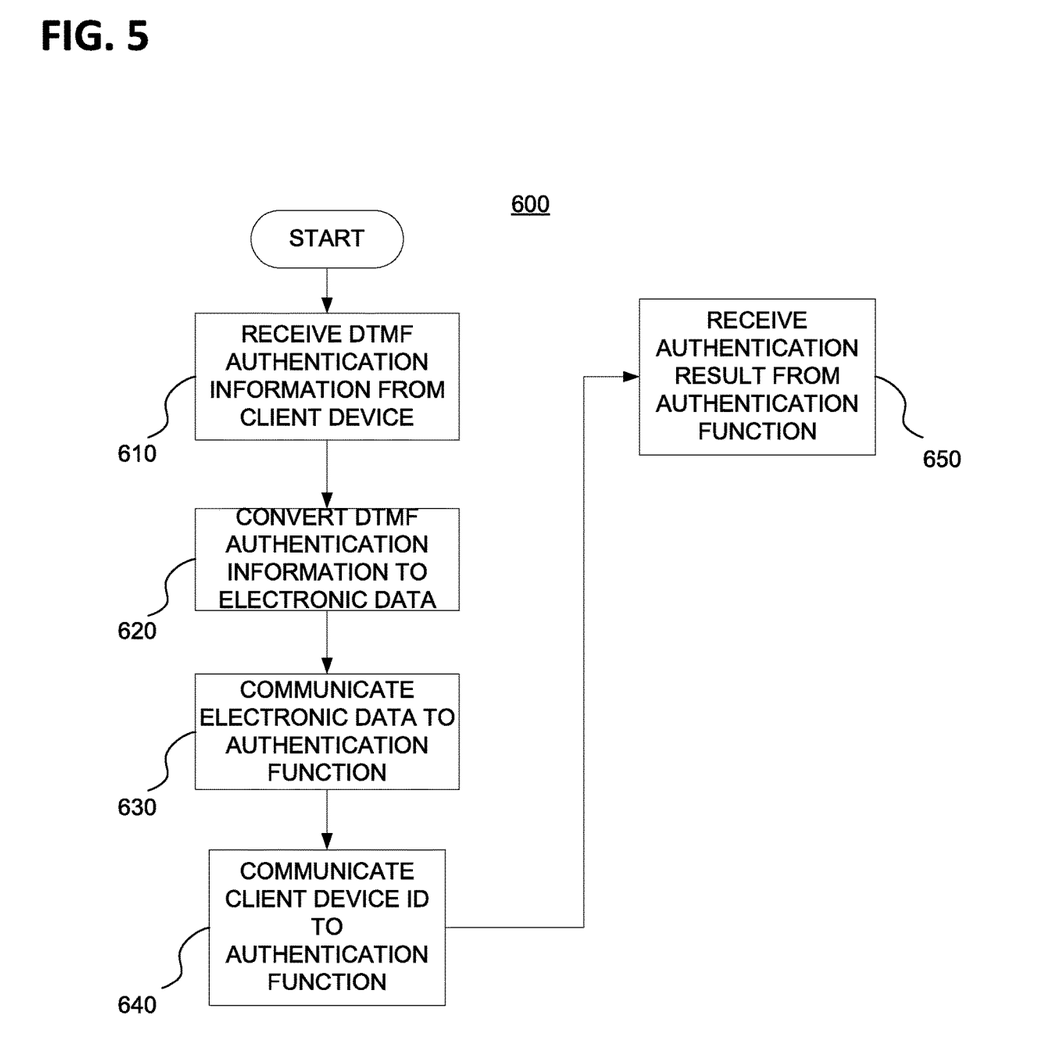
FIG. 5 is a flow chart illustrating a method for use in a server, according to an embodiment.

Above, the disclosure describes methods utilized in a client device 100. Turning now to FIG. 5, a flow chart illustrates a method 600 for use in a first server (e.g., first server 120). In operation 610, the first server 120 receives from a client device 100 via a telephone call, a DTMF signal that includes authentication information including at least a passcode. In operation 620, the first server 120 may convert the audio representation (i.e., the DTMF signal) of the authentication information into electronic data. In operation 630, the electronic data is communicated to an authentication function. As described above, the authentication function/server 150 may be incorporated in the first server 120. The first server 120 may (in operation 640) additionally communicate, to the authentication function, a client device identifier. In some implementations, the electronic data, the client device identifier and/or other metadata may be encoded, for example to prevent the authentication function/server 150 from receiving personally identifiable information. For example, encoding the client device identifier may provide an anonymized version of the identifier. Such encoding may thus be particularly useful in implementations where the authentication function/server 150 is implemented apart from the first server (e.g., IVR) and operated by a third party. The metadata may include, for example, the telephone number of the client device 100 or a user's name. The first server 120 may select the metadata from a non-volatile memory of the first server 120 or may simply forward metadata received from the client device along with the passcode.

In operation 650, the first server may receive an authentication result from the authentication function/server 150 indicating, for example, success or failure. In some embodiments, the authentication result may provide additional information. For example, if the nature of the electronic data corresponding to the passcode, the client device identifier, or other information (or a combination of same) provided to the authentication function/server 150 suggests a fraudulent activity, the authentication result may provide information to the first server 120 identifying evidence of such fraudulent activity.

Figure 6:
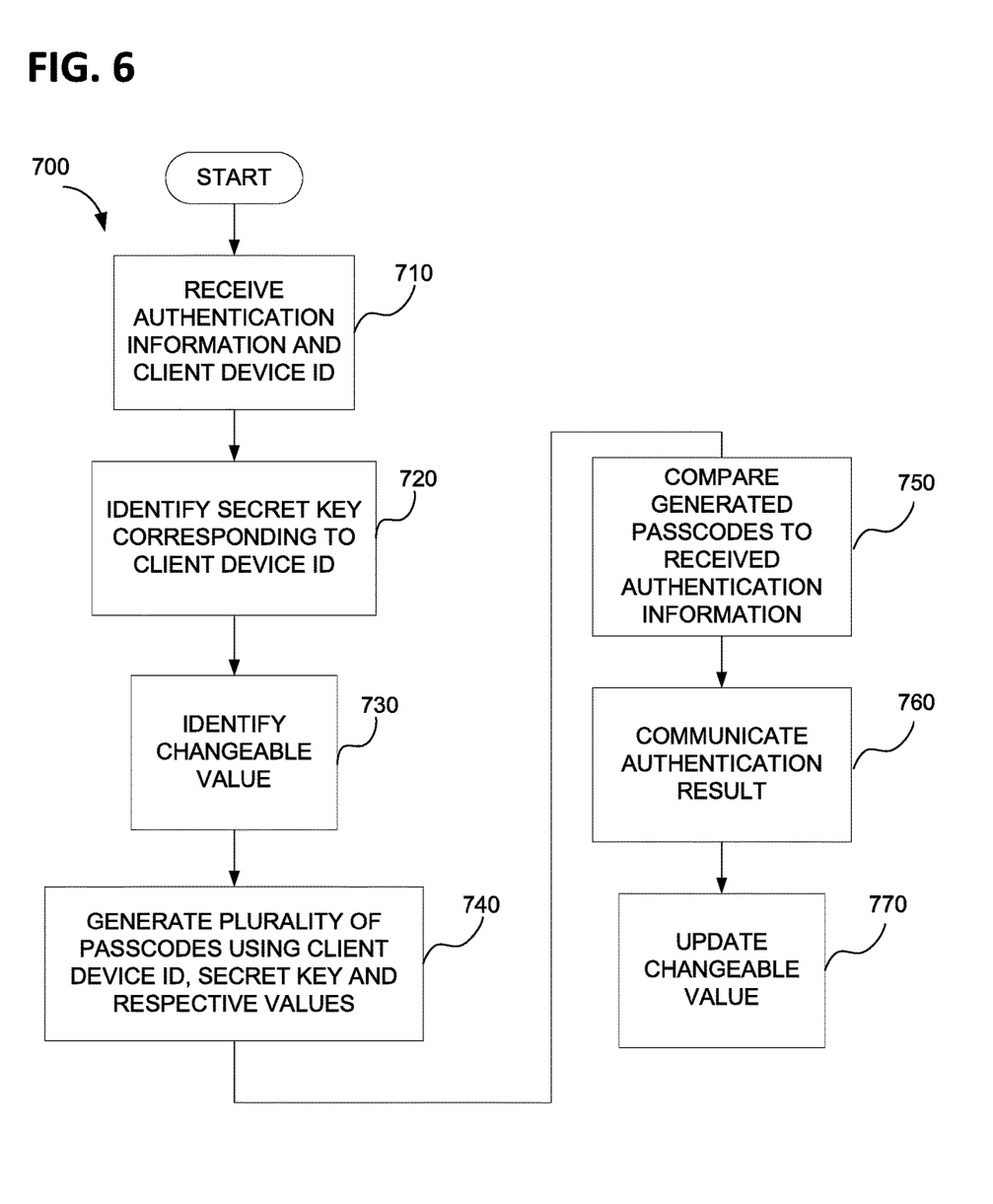
FIG. 6 is a flow chart illustrating a method performed in a function or server, according to an embodiment.

FIG. 6 is a flow chart illustrating a method 700 performed in an authentication function/server 150. As noted earlier, the authentication function/server may be implemented in a first server (e.g., IVR) 120 or in a separate, dedicated server. In operation 710, the authentication function/server 150 may receive, via a data channel, authentication information and a client device identifier from the first server 120. The authentication information may include a passcode generated at the client device 100 by encoding a secret key with a session-specific value. In some embodiments the client device identifier may be encoded to preserve anonymity. In operation 720, the authentication function/server may identify a secret key or token corresponding to the client device identifier. For example the authentication function/server 150 may have access to a previously stored copy of the client device identifier (or encoded client device identifier) indexed to the secret key or token, the secret key or token being the same as the secret key or token used by the client device 100 to generate the passcode represented in the authentication information. The authentication function/server 150 may thus look up the secret key or token using the client device identifier.

In operation 730, the authentication function identifies a previously stored changeable value. As noted above, during a registration operation (200, in FIG. 2), the client device 100 stores a changeable value received in information from the authentication function/server 150. The authentication function/server 150 also stores the changeable value for later use. In operation 740, the authentication function/server 150 generates a plurality of comparison passcodes based on the identified secret key or token and iterations of changeable value. For example, in a case where the changeable value is a random numeric value that is updated by adding 1 for each session, the authentication function/server 150 may generate a plurality of comparison passcodes from the secret key and several updates of the changeable value in order to address possible failures in mutually updating the changeable value. The multiple generated comparison passcodes are then compared, in operation 750, with the authentication information received at the authentication function/server 150. A match confirms authentication, while failure to match does not confirm authentication. In operation 760 an authentication result may be communicated to the first server 120. In some implementations, the authentication result may be communicated directly to the client device 100. In operation 770, the authentication function/server 150 updates the changeable value for use in a next session with the client device 100.

In some embodiments, the authentication information received by the authentication function/server 150 may include information (metadata) in addition to a passcode. For example, as noted above, metadata may include location information of the client device (e.g., a cell tower ID, a zip code, a general geographical area and/or GPS coordinates, or the like), an account number, biometric data (e.g., voice statistics, gender, or the like), client statistics or history, and/or personally identifiable information (e.g., name, address, government identification number, or the like). Such information may be compared with expected values stored for access by the authentication function to further inform authentication. For example, location information provided with the authentication information may be compared against one or more previously reported locations, a home postal code, or even a home region in order to help identify potential fraudulent access. The authentication function/server 150 may be configured to communicate a notification when such metadata values do not match or nearly match expected values.

In a specific example, if someone wishes to withdraw money from an automated teller machine (ATM), he may approach the ATM, open a mobile app having features disclosed herein, enter an amount of money to withdraw from the user's bank account, and click a call button. An authentication server for the bank may authenticate the user's identity and dispense money from the ATM. The telephone call to the bank may thus automatically communicate include the user's location (near the ATM), account number and desired withdrawal amount, and session-specific user (or device) verification information using a one time password (authentication information generated from previously stored secret key and session-specific, changeable value) all sent to the IVR using DTMF signaling.

In another implementation, a first server (IVR) may be connected to a home automation system. Thus, a user may telephone a personal or hosted IVR to, e.g., control aspects of the home, unlock or open doors, set thermostat temperatures, turn on lights, and so forth by selecting desired actions in an app configured to generate "metadata" for communication by telephone to the first server along with the authentication information.

In the preceding detailed description, various specific details are set forth in order to provide an understanding of improvements for speaker recognition in a call center, and describe the apparatuses, techniques, methods, systems, and computer-executable software instructions introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

The present invention generally relates to an apparatus for performing the operations described he may be specially constructed for the required purposes such as a graphics processing unit (GPU), digital signal processor (DSP), application specific integrated circuit (ASIC), field programmable gate array (FPGA) special purpose electronic circuit, or it may comprise a general-purpose computer selectively activated or reconfigured by a computer program stored in the computer. Such a computer program may be stored in a non-transient computer readable storage medium, such as, but is not limited to, any type of disk including optical disks, CD-ROMs, magneto-optical disks, read-only memories (ROMs), random access memories (RAMs), EPROMs, EEPROMs, magnetic or optical cards, integrated memory, "cloud" storage, or any type of computer readable media suitable for storing electronic instructions.

Algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method comprising:
   in a registration operation through a data channel:
      transmitting, by a computer through the data channel, authentication information to a client device;
   in an operating mode over only a telephone channel between the client device and the computer and non-contemporaneous with the registration operation:
      receiving, by the computer via a phone call from the client device through the telephone channel, an authentication sequence represented by dual-tone multi-frequency (DTMF) tones, at least a portion of the authentication sequence generated locally at the client device based upon the authentication information transmitted to the client device via the data channel; and
      authenticating, by the computer, the phone call based upon the received authentication sequence.

2. The computer-implemented method of claim 1, wherein the authentication information includes a seed for generating the authentication sequence.

3. The computer-implemented method of claim 1, wherein the authentication information includes a token associated with the client device for generating multiple authentication sequences including the authentication sequence.

4. The computer-implemented method of claim 3, wherein the authentication sequence includes a passcode.

5. The computer-implemented method of claim 4, wherein the passcode is a hash encoding or keyed-hash encoding of the token associated with the client device and a session-specific value.

6. The computer-implemented method of claim 5, further comprising:
   authenticating, by the computer, the phone call in response to the computer determining that the passcode in the received authentication sequence matches a corresponding passcode generated by the computer utilizing the token associated with the client device.

7. The computer-implemented method of claim 6, further comprising:
   retrieving, by the computer, the token associated with the client device utilizing a device identifier of the client device.

8. The computer-implemented method of claim 7, wherein the device identifier is a phone number associated with the client device.

9. The computer-implemented method of claim 1, further comprising:
   transmitting, by the computer through the data channel, the authentication information to the client device in response to the computer authenticating a user associated with the client device through the data channel.

10. The computer-implemented method of claim 1, wherein the authentication sequence includes metadata associated with the phone call.

11. A system comprising:
a non-transitory storage medium storing a plurality of computer program instructions; and
a processor electrically coupled to the non-transitory storage medium and configured to execute the plurality of computer program instructions to:
  in a registration operation through a data channel:
    transmit through the data channel, authentication information to a client device;
  in an operating mode over only a telephone channel between the client device and the system and non-contemporaneous with the registration operation:
    receive, via a phone call from the client device through the telephone channel, an authentication sequence represented by dual-tone multi-frequency (DTMF) tones, at least a portion of the authentication sequence generated locally at the client device based upon the authentication information transmitted to the client device via the data channel; and
    authenticate the phone call based upon the received authentication sequence.

12. The system of claim 11, wherein the authentication information includes a seed for generating the authentication sequence.

13. The system of claim 11, wherein the authentication information includes a token associated with the client device for generating multiple authentication sequences including the authentication sequence.

14. The system of claim 13, wherein the authentication sequence includes a passcode.

15. The system of claim 14, wherein the passcode is a hash encoding or keyed-hash encoding of the token associated with the client device and a session-specific value.

16. The system of claim 15, wherein the processor is configured to further execute the plurality of computer program instructions to:
  authenticate the phone call in response to the processor determining that the passcode in the received authentication sequence matches a corresponding passcode generated by the processor utilizing the token associated with the client device.

17. The system of claim 16, wherein the processor is configured to further execute the plurality of computer program instructions to:
  retrieve the token associated with the client device utilizing a device identifier of the client device.

18. The system of claim 17, wherein the device identifier is a phone number associated with the client device.

19. The system of claim 11, wherein the processor is configured to further execute the plurality of computer program instructions to:
  transmit through the data channel, the authentication information to the client device in response to the processor authenticating a user associated with the client device through the data channel.

20. The system of claim 11, wherein the authentication sequence includes metadata associated with the phone call.

* * * * *